(12) United States Patent
Mitchell

(10) Patent No.: US 6,170,645 B1
(45) Date of Patent: Jan. 9, 2001

(54) CONVEYOR SYSTEM HAVING A FRAME ADAPTED TO RECEIVE A BEARING

(76) Inventor: Charles L. Mitchell, 467 Wards Corner Rd., Loveland, OH (US) 45140-9027

(*) Notice: Under 35 U.S.C. 154(b), the term of this patent shall be extended for 0 days.

(21) Appl. No.: 09/065,141

(22) Filed: Apr. 23, 1998

(51) Int. Cl.$^7$ ................................................. B65G 23/44
(52) U.S. Cl. ................................. 198/816; 198/860.1
(58) Field of Search ................................ 198/813, 816, 198/832, 835, 860.1

(56) References Cited

U.S. PATENT DOCUMENTS

| | | |
|---|---|---|
| 2,808,924 * | 10/1957 | Wood ................................. 198/816 |
| 3,946,861 | 3/1976 | Sandefur . |
| 4,007,827 | 2/1977 | Mattos . |
| 4,049,328 | 9/1977 | Ouska et al. . |
| 4,079,834 | 3/1978 | Fletcher, Jr. et al. . |
| 4,185,908 | 1/1980 | Taylor et al. . |
| 4,202,441 | 5/1980 | Bourgeois . |
| 4,241,959 | 12/1980 | Frister . |
| 4,253,343 | 3/1981 | Black et al. . |
| 4,284,192 | 8/1981 | Taylor . |
| 4,372,440 | 2/1983 | Ringis . |
| 4,487,309 | 12/1984 | Dorner . |
| 4,598,819 | 7/1986 | Siegwart . |
| 4,732,266 | 3/1988 | Dorner . |
| 4,759,434 | 7/1988 | Dorner . |
| 4,832,328 | 5/1989 | Graham . |
| 4,881,633 | 11/1989 | Cailey et al. . |
| 4,951,809 | 8/1990 | Boothe et al. . |
| 5,054,608 | 10/1991 | Bryant . |
| 5,129,507 | 7/1992 | Maeda et al. . |
| 5,131,529 | 7/1992 | Dorner . |
| 5,174,435 * | 12/1992 | Dorner et al. ................... 198/816 X |
| 5,234,100 | 8/1993 | Cook . |
| 5,259,495 | 11/1993 | Douglas . |
| 5,314,059 | 5/1994 | Clopton . |
| 5,316,134 | 5/1994 | Donohue . |
| 5,383,549 | 1/1995 | Mayer . |
| 5,389,045 | 2/1995 | Lyons . |
| 5,447,224 | 9/1995 | Gebhardt . |
| 5,482,266 | 1/1996 | Takemoto et al. . |
| 5,529,171 | 6/1996 | Langenbeck . |
| 5,584,377 | 12/1996 | Lago . |
| 5,632,372 | 5/1997 | Steinbuchel, IV et al. . |
| 5,947,263 * | 9/1999 | Uber et al. ........................ 198/816 X |
| 5,947,264 * | 9/1999 | Eltvedt .................................. 198/816 |
| 5,984,083 * | 11/1999 | Hosch et al. ..................... 198/816 X |

OTHER PUBLICATIONS

Wardcraft Conveyors Catalog, "Modular Slug–Vayor"; pp. Front/Back Covers, 2,3; (1991).

Dorner Catalog, "Low Profile Extruded Alloy Belt Conveyors"; pp. Front/Back Covers, 2–4, 8, 10, 12, 20–24; (Undated).

QC Industries Inc. Catalog, "125 Series—The Industry Leader in Modular Conveyor Systems"; pp. Front/Back Covers, 4–8, 14, 15, 26–31; (Undated).

QC Industries Inc. Catalog, "125 Series—Modular Conveyor Systems"; pp. Front/Back Covers, 3–5, 8, 10, 20–23; (Undated).

* cited by examiner

Primary Examiner—James R. Bidwell
(74) Attorney, Agent, or Firm—Dinsmore & Shohl LLP

(57) ABSTRACT

A conveyor system comprises a pulley provided with a bearing. The bearing includes an outer bearing race with an outer surface. The conveyor system further comprises a frame with a side plate having a top end defining a first cut-out. At least a portion of the outer surface of the outer bearing race is engaged with the first cut-out. The side plate also defines a second cut-out providing an opening into the first cut-out. The second cut-out facilitates insertion of the bearing into the first cut-out.

11 Claims, 12 Drawing Sheets

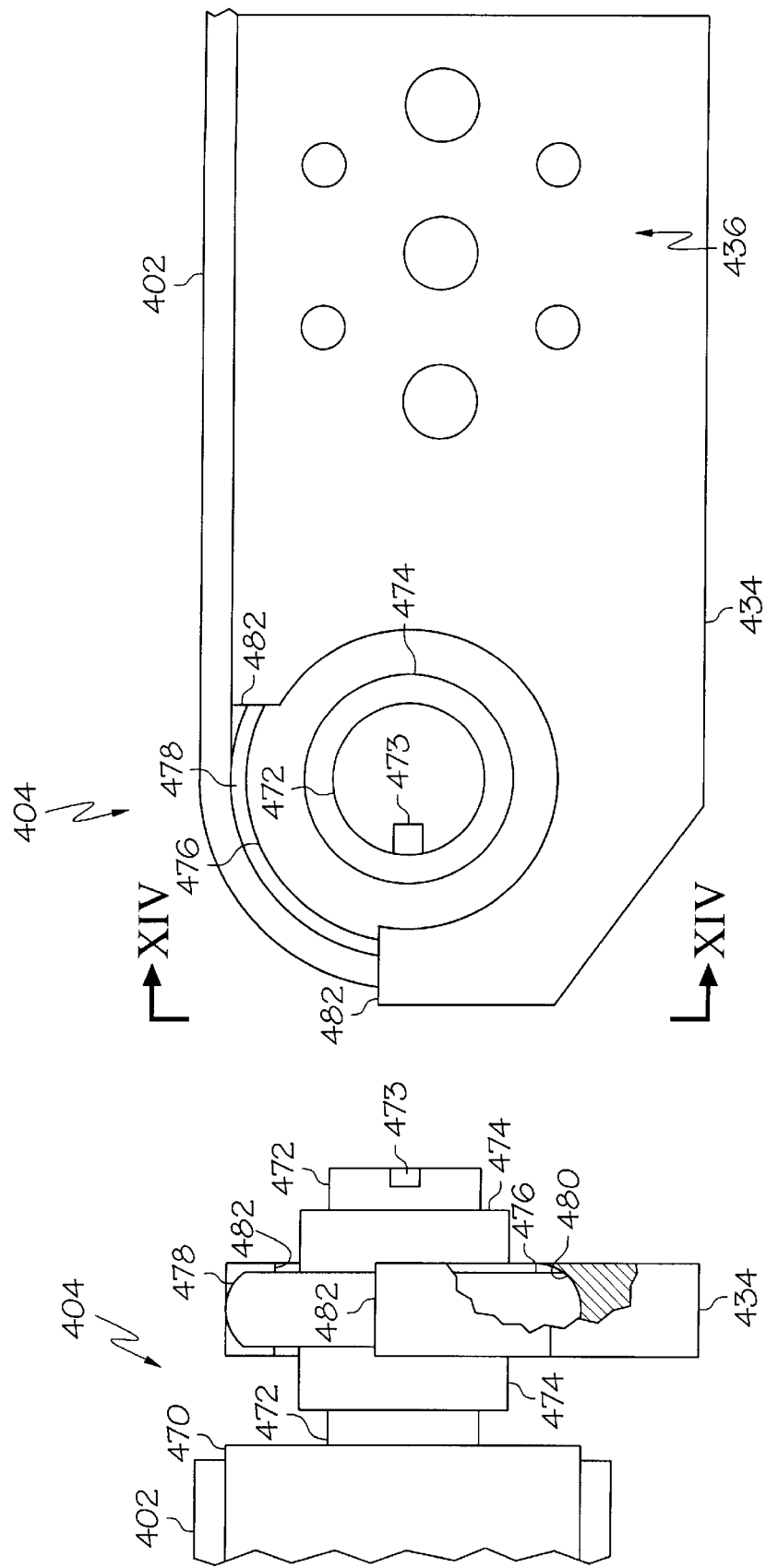

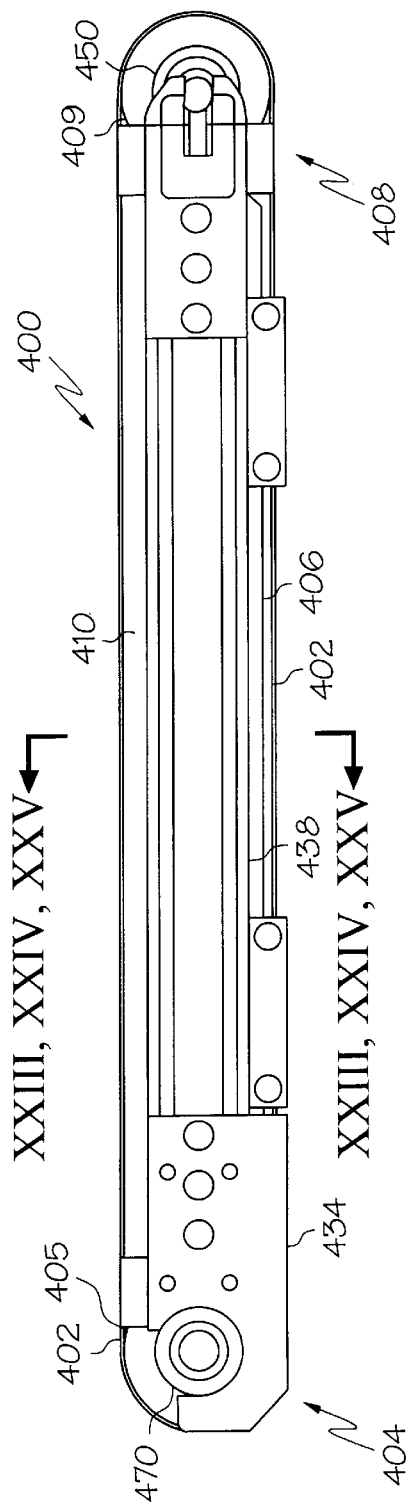
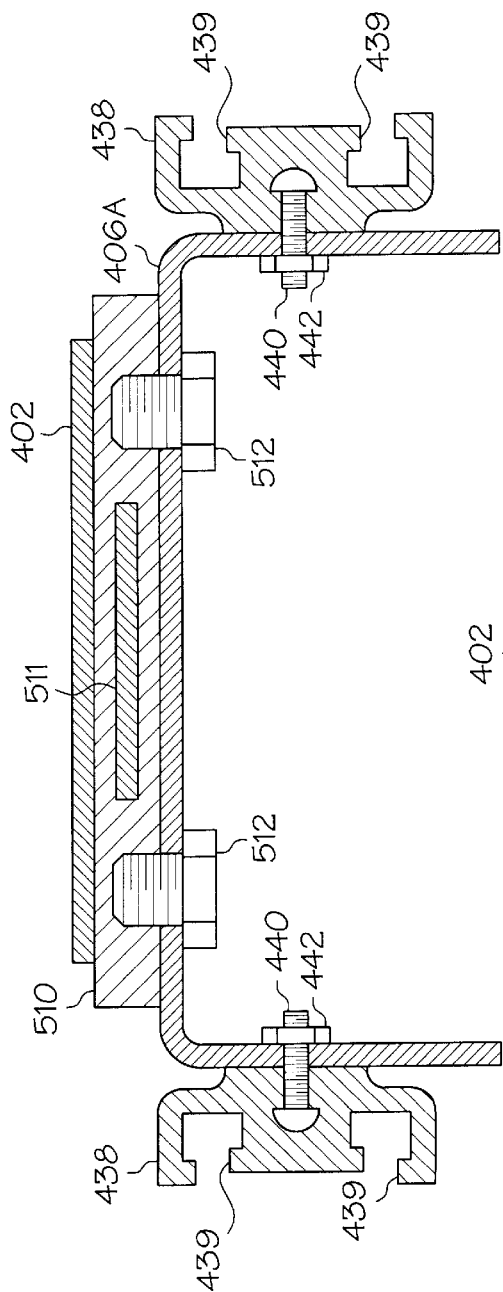
FIG. 22
FIG. 23

CONVEYOR SYSTEM HAVING A FRAME ADAPTED TO RECEIVE A BEARING

FIELD OF THE INVENTION

The present invention is directed to a conveyor system, such as a conveyor belt system. The present invention is more particularly directed to a conveyor system with interchangeable bed modules and pulley sleeves.

BACKGROUND OF THE INVENTION

Conveyor belt systems are widely used to transport objects in various industrial, assembly and automation applications. For transporting relatively small objects, relatively small conveyor belt systems are used with dimensions on the order of several feet in the longitudinal (direction of conveyance) direction and two inches to several feet in the transverse direction.

A conventional conveyor belt system, shown in FIG. 1, includes a drive pulley 104, a tail pulley 108, a frame 106, a bed 106A and a conveyor belt 102. The belt 102 is looped around the pulleys 104, 108 and over the bed 106A. The drive pulley 104 is driven to rotate in the direction R1 by a driver (not shown) such as a conventional drive motor.

The rotating drive pulley 104 maintains rolling contact with the belt 102, thereby driving the belt 102 to rotate in the direction R2 around the frame 106. The tail pulley 108 also maintains rolling contact with the belt 102, and freely rotates in the direction R3 in response to the rotation of belt 102. In this way, the tail pulley 108 supports rotating belt 102 without significantly impeding its rotation.

Frame 106 supports the pulleys 104, 108 so that they are appropriately spaced apart from each other. Frame 106 also includes an integral bed 106A. The integral bed 106A is generally constructed as a unitary piece with the rest of the, frame 106, or is permanently fixed thereto.

The bed 106A provides a relatively slick and relatively continuous surface to support the underside of the belt 102. Because of the fairly continuous surface provided by the bed 106A, objects placed on the top of the belt 102 will be substantially continuously supported by the underlying bed 106A, thereby minimizing shear stress and strain on the belt 102 itself. Because the bed 106A is relatively slick, the belt 102 will slide over the bed 106A with relatively low friction, even when objects on top of the belt 102 weigh the belt 102 down onto the bed 106A, thereby minimizing longitudinal forces in the belt 102.

As shown in FIG. 1, the bed surface defines a line, herein called the bed height BH. The belt 102 travels over and along this bed height BH line. The tops of the drive pulley 104 and the tail pulley 108 are both co-linear with the bed height BH line. In other words the pulleys 104, 108 have an outer radius of H1 so that the tops of these pulleys reach the level of the bed. Thus, the height of the pulleys match the height of the bed.

This matching of pulley and bed heights is important for several reasons. First, if there is a disparity in heights between the pulley and the bed, then an object being transported on top of the belt 102 may be jolted as it travels over a portion of the system 100 where there is a transition in height between the bed 106A and a pulley 104 or 108. This kind of jolting caused by mismatched heights may be especially troublesome in application where two conveyor systems are placed end to end to effect a longer conveyor run.

Second, if bed 106A is significantly lower than the height of the pulleys, then the belt 102 will not be supported by the bed 106A. When heavy objects are placed on the belt 102, the belt 102 may be (temporarily or permanently) deformed by objects pushing the unsupported belt 102 down to the level of the bed 106A.

Third, if the bed 106A is significantly higher than the pulleys 104, 108, then the belt 102 will be pulled tightly around the transverse edges of the bed. This increases wear on the belt 102.

Fourth, if the bed 106A is significantly higher than the pulleys 104, 108, then the contact area between the belt 102 and the drive pulley 104 will be reduced, thereby decreasing the load which the drive pulley 104 can effectively drive the belt 102 to convey. For at least these reasons, matching pulley and bed height is an important precept in the design of most conveyor belt systems.

In the embodiment of FIG. 1, the heights of the pulleys 104, 108 and the bed 106A are exactly the same (all heights are at the BH line). However, depending on factors such as the material of the belt, optimal performance may involve making the height of the bed either slightly higher or slightly lower than the height of the pulleys. In other words, the height of the pulleys may be slightly displaced from the bed line BH.

For example, if a conveyor belt is made of a stiff material, then the belt may not follow the outer surface of each pulley for a full 180° (even with an appropriate degree of tightening), and the belt may therefore come off the pulley at an angle relative to the tangent direction taken at the top of the pulley. This phenomenon is known as cupping. In this case, the frame may optimally be designed so that the bed is a bit higher than the top of the pulley, to appropriately account for the angle at which the belt comes off of the pulleys.

As used herein, the pulleys and bed are "matched" in height when the height of the pulleys and the height of the bed are close enough to each other to provide good performance and a low degree of belt stress, strain and wear, especially in view of the above-described problems caused by wide height disparities. As used herein, the pulleys and bed may be "matched" in height, even if their heights are not exactly the same, whether the slight disparity in heights is a result of design or random variations (such as manufacturing variations).

It is also noted that two pulleys and a bed may be matched in height even if the pulleys have different radii. In order to be matched in height, the top of each pulley should merely be sufficiently close to the height of the bed for optimal performance under the circumstances of the application.

Another embodiment of a conventional conveyor belt system 200 is shown in FIG. 2. Conveyor belt system 200 includes a belt 202, a drive pulley 204, a frame 206, a tail pulley 208 and a bed 210. The conveyor belt system 200 is similar to conveyor belt system 100, except that instead of an integral bed such as 106A, the bed 210 is connected to frame 206.

One advantage of such a detachable bed 210, is that the bed 210 can easily be made from a different material than the frame 206. For example the frame 206 may be made from metal, while the bed 210 might be made of ultra high molecular weight polymer (herein UHMW), which provides a smooth, slick supporting surface for the belt 202. However, conveyor system 200 cannot be used without the detachable bed 210 for two reasons explained below.

First, if the system 200 is used without the detachable bed 210, then the pulley height and the height of the frame 206 (without a bed) will be drastically mismatched. The pulleys 204, 208 have an outer radius of H4 and a resulting height of BH'. Likewise, the bed 210 also has a height of BH'. More specifically, as shown in FIG. 2, when the detachable bed 210 is in place, the aggregate height of the frame 206 (H2) and bed 210 (H3) adds up to H4, thereby matching the height of the pulleys 204, 208 at the bed height BH' line. If the bed 210 is removed, ther the height of the frame H2 would fall short of the BH' line defined by the tops of the pulleys 204, 208, and the heights would be problematically mismatched.

Second, the frame 206 (without the detachable bed 210) does not provide a good bed surface for the belt 202, because it is not continuous. FIG. 3 shows the frame 206 from its underside. The frame 206 is actually a lattice of several elongated, aluminum members 212, 214, 216, 217, 218, 220, 222.

More specifically, the frame 206 is assembled from two extruded side walls 212, 214, three transverse members 216, 217, 218 and two support members 220, 222. While this frame 206 is considerable lighter and easier to fabricate than a solid aluminum frame would be, the frame does not provide a continuous surface appropriate for supporting a load bearing conveyor belt (as shown in FIGS. 3 arid 4). This makes bed 210 a necessary component of conveyor belt system 200.

Because the conveyor belt system 200 requires bed 210, the pulleys 204, 208 must be chosen so that the top of each pulley 204, 208 corresponds with the aggregate height of the frame and bed assembly. In both conventional conveyor belt systems 100, 200 described above, the effective height of the bed must be determined when the system is designed so that the height of the pulleys will match the height of the bed (integral 106A or detachable 210) which will be used.

As will be understood, conventional conveyor belt systems such as 100, 200 do not allow for any modifications which would change the effective bed height, because a change in bed height would necessitate a change in the pulleys, which is an extremely difficult change to make in practice. For example, a change to larger pulleys can cause physical interference between the pulleys and the frame. Therefore, any modification in bed height will generally require an entirely new conveyor system, essentially designed from scratch, so that the pulley height appropriately matches the bed height.

SUMMARY OF THE INVENTION

Accordingly, it is an object of some embodiments of the present invention to provide a conveyor belt system with a modular bed and pulley system, wherein the effective height of the bed and pulleys can easily be changed, without causing a mismatch in height between the bed and pulleys.

It is a further object of some embodiments of the present invention, to provide a conveyor system which can be used either with or without a detachable bed module.

It is a further object of some embodiments of the present invention to provide a conveyor system which addresses the problems and shortcomings of prior conveyor systems described herein.

It is a further object of some embodiments of the present invention to provide a conveyor system design which enables easier interchangeability of conveyor beds, pulleys, belts and frames to simplify the design, manufacture and availability of adaptable systems.

According to some embodiments of the present invention, a conveyor belt system includes a first pulley, a second pulley and a frame. The first pulley and second pulleys each have an outer circumferential surface. The frame is rotatably connected to the first pulley and the second pulley, and the frame includes a bed surface which is matched in height to the outer circumferential surface of the first pulley and the outer circumferential surface of the second pulley. The frame also includes bed mounting structures adapted to attach a bed module over the bed surface of the frame.

According to some embodiments of the present invention, a conveyor belt system includes a first pulley, a second pulley, a frame, a first pulley sleeve, a second pulley sleeve, and a bed module. The first and second pulley sleeves are attached respectively around the outer circumferential surface of the first and second pulleys. The frame includes a bed surface which is matched in height to the outer circumferential surface of the first pulley and the outer circumferential surface of the second pulley. The bed module is attached to the frame and is matched in height to the outer circumferential surface of the first pulley sleeve and the outer circumferential surface of the second pulley sleeve.

Still other objects of the present invention will become readily apparent to those skilled in this art from the following description wherein there is shown and described a preferred embodiment of this invention, simply by way of illustration, of some of the best modes contemplated for carrying out this invention. As will be realized, the invention is capable of other different embodiments, and its several details are capable of modification in various aspects all without departing from the invention. Accordingly, the drawings and descriptions will be regarded as illustrative in nature and not as restrictive.

BRIEF DESCRIPTION OF THE DRAWINGS

The present invention as set forth in the detailed description will be more fully understood when viewed in connection with the drawings in which:

FIG. 14 is a partial, broken-out end view of the drive pulley assembly of the conveyor belt system of FIG. 12;

FIG. 15 is a partial side view of the drive pulley assembly of the conveyor belt system of FIG. 12;

FIG. 22 is a side view of the second embodiment of a conveyor system with a bed module and pulley sleeves installed;

FIG. 23 is a cross-sectional view of the conveyor system of FIG. 22, taken along lines XXIII—XXIII thereof, showing a magnetic bed module;

DETAILED DESCRIPTION OF THE PREFERRED EMBODIMENTS

Figure 1:
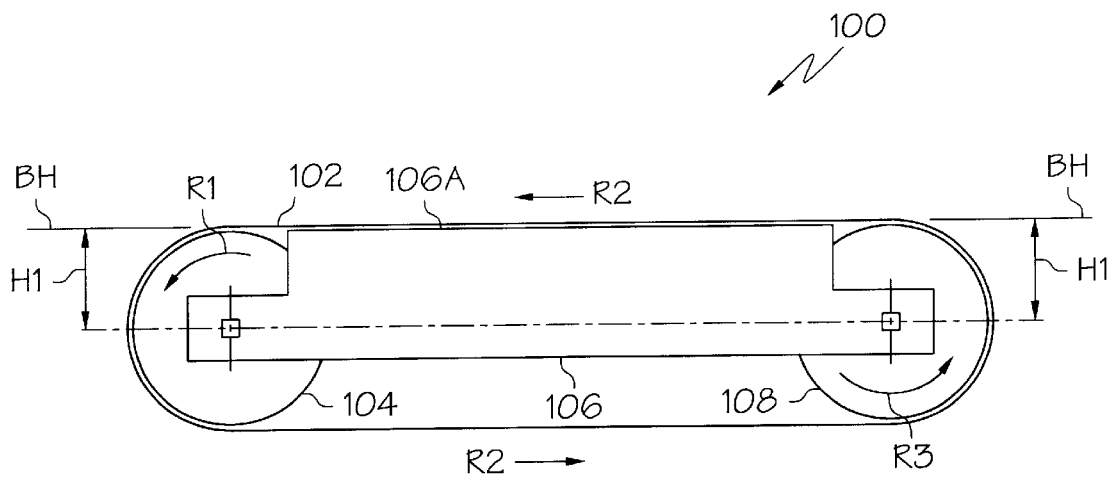
FIG. 1 is a side view of a conventional conveyor belt system.
Figure 2:
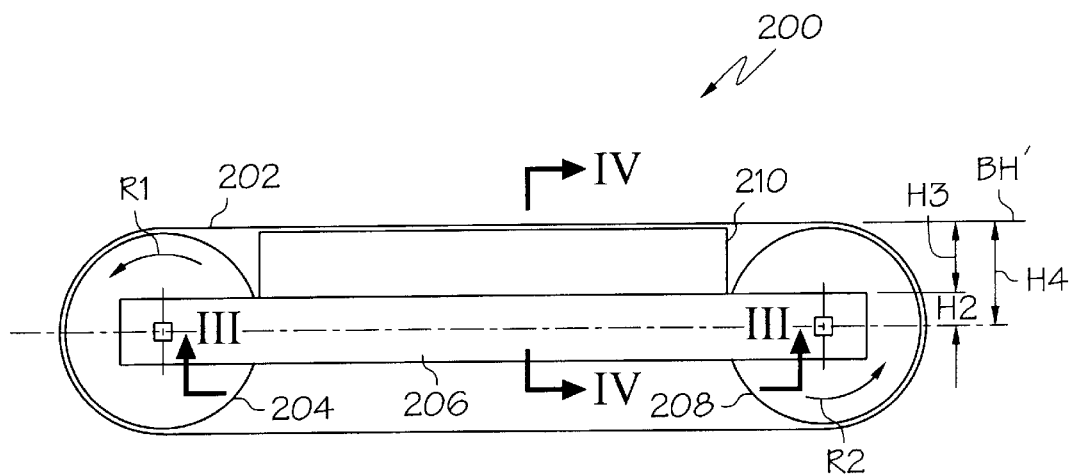
FIG. 2 is a side view of another conventional conveyor belt system.

Referring now to the drawings in detail, wherein like numerals indicate the same elements throughout the Figures, FIGS. 5 to 11 set forth an embodiment of a conveyor system 300 according to the present invention which shows the use of a detachable bed module and detachable pulley sleeves that are matched in height. The conveyor system 300 includes a drive pulley 304, a drive pulley sleeve 305, a frame 306, a tail pulley 308, a tail pulley sleeve 309 and bed module 310. Before use, a belt appropriate for the desired application would be looped around the outer circumferential surface of the pulley sleeves 305, 309 and the bed module 310, and appropriately tensioned. To simplify the drawings, the belt is not shown in FIGS. 5 to 11.

Figure 5:
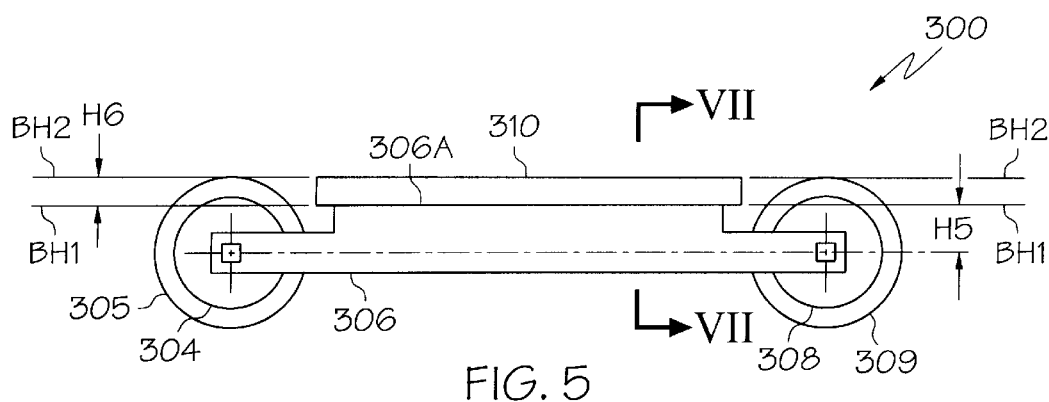
FIG. 5 is a side view of a first embodiment of a conveyor system according to the present invention with a modular bed module and pulley sleeves in place.
Figure 6:
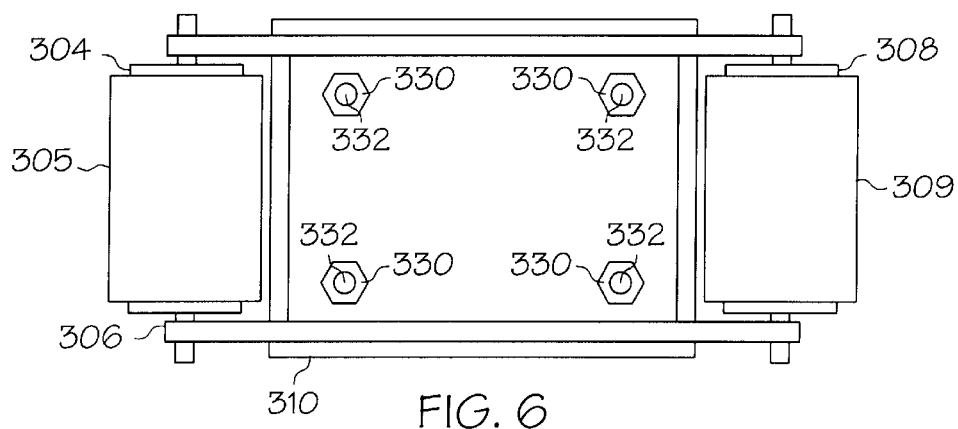
FIG. 6 is a bottom view of the conveyor system shown in FIG. 5.
Figure 7:
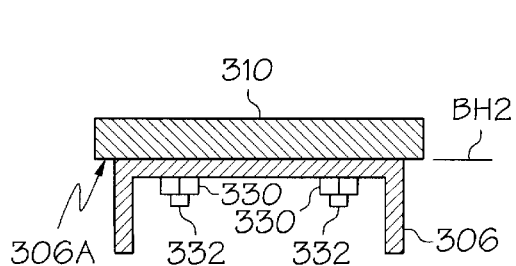
FIG. 7 is a partial sectional view of the conveyor system shown in FIG. 5 as viewed from section lines VII in FIG. 5.

In FIG. 5, a bed module 310 is detachably attached to frame 306, and may be one of many types (e.g., vacuum bed, high speed bed, self-tracking bed, magnetic bed) which are discussed in more detail below. As shown in FIGS. 6 and 7, the bed module 310 is detachably attached to the frame 306 by four nuts 330 and four flat-head screws 332. The quantity and type of fasteners may vary with the specific application and with the length of the conveyor system. Four holes 331 in frame 306 (see FIG. 11) serve as bed mounting structures which allow the bed module 310 to be detachably attached to frame 306. Of course, other types of bed mounting structures, such as latches, mounting grooves, studs or magnets could be alternatively used to achieve this detachable attachment between the bed module 310 and the frame 306. Alternatively, the bed module 310 may be permanently attached to the frame 306, such as by welding these parts together.

The bed module 310 is illustrated herein as having a thickness of H6. Therefore, when the bed module 310 is attached to the frame, the height in the vicinity of the bed module 310 is increased by thickness H6 from a height of BH1 (height of the top of the frame) to a height of BH2. This height BH2 of the bed module 310 needs to be matched at the drive pulley end and the tail pulley end. This matching of heights is preferably accomplished properly sizing pulley sleeves 305 and 309.

The drive pulley 304 is rotatably connected at one end of the frame 306, and the tail pulley is rotatably connected at the other end of the frame 306. The drive pulley 304 can be driven to rotate by a driver (not shown), such as a conventional rotary drive motor. As shown in FIG. 5, drive pulley 304 and tail pulley 308 each have a radius of H5, such that the tops of these pulleys have a height of BH1. In some preferred embodiments, radius H5 will be about one inch. As further explained below, frame 306 includes a bed surface 306A, which has a height of BH1, which matches the height of the pulleys 304, 308.

Figure 8:
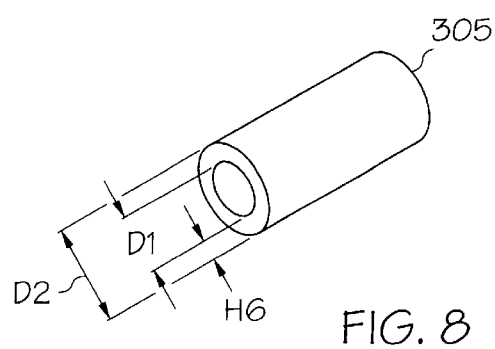
FIG. 8 is a perspective view of a pulley sleeve used in the conveyor system shown in FIG. 5.

Drive pulley sleeve 305 is shown in FIG. 8, and is preferably made of urethane, with an inner diameter D1, an outer diameter D2 and an annular thickness H6. When the drive pulley sleeve 305 is made of urethane, it can maintain good rolling contact with a belt with sufficient friction to minimize slippage. It is noted that the pulley sleeves can also be made of many other materials, such as butyl rubber, nitryl rubber or neoprene.

As shown in FIG. 5, the drive pulley sleeve 305 fits around the drive pulley 304 and is detachably attached thereto. More specifically, in this preferred embodiment, the inner diameter D1 of the drive pulley sleeve is slightly smaller than the outer diameter of the drive pulley 304, so that the urethane drive pulley sleeve 305 can be friction fit onto the drive pulley 304. In order to effect this friction fit, it may be necessary to use an arbor press or a small hydraulic press.

When the drive pulley sleeve 305 is placed around the drive pulley 304, the effective height at the drive pulley end is increased by the annular thickness of the pulley sleeve H6 from BH1 to BH2. (See FIG. 5.) In other words, the aggregate radius of the drive pulley H5 and the annular thickness of the pulley sleeve H6 preferably cause the top of the pulley sleeve to reach a height of BH2. It is noted that the pulley sleeve may be stretched to some degree as it is placed around pulley 304, which can cause a slight decrease in the annular thickness of the sleeve after it is placed around the pulley 304. In some embodiments, it may be desirable to use a slightly thicker pulley sleeve to compensate for this resulting decrease in thickness.

The frame 306 and bed module 310 should be designed so as to avoid physical interference between the pulley sleeve 305 and the frame 306 or bed module 310. As shown in FIG. 6, there is preferably provided some clearance between the pulley sleeve 305 and the bed module 310.

Similarly, urethane tail pulley sleeve 309 is detachably attached to tail pulley 308, to increase the height at the tail pulley end by annular thickness H6 from BH1 to BH2. In this way, the drive pulley end, the vicinity of the bed module 310 and the tail pulley end all have matching effective heights along BH2. When a belt is looped around the pulley sleeves 305, 309 and over the bed module 310, all the heights will be matched, thereby avoiding the problems associated with mismatched heights. By using appropriate pulley sleeves 305, 309, various bed modules 310 of various thicknesses can be used with the same basic frame 306, drive pulley 304 and tail pulley 308.

In addition to the advantage that the conveyor system 300 can be used with various bed modules 310, the conveyor system 300 can also be used without any bed module 310 or pulley sleeves 305, 309. This is possible because frame 306 includes a substantially continuous bed surface 306A (see FIGS. 7, 9 and 11) and because the bed surface 306A and the pulleys 304, 308 are matched in height (see FIG. 9).

Figure 9:
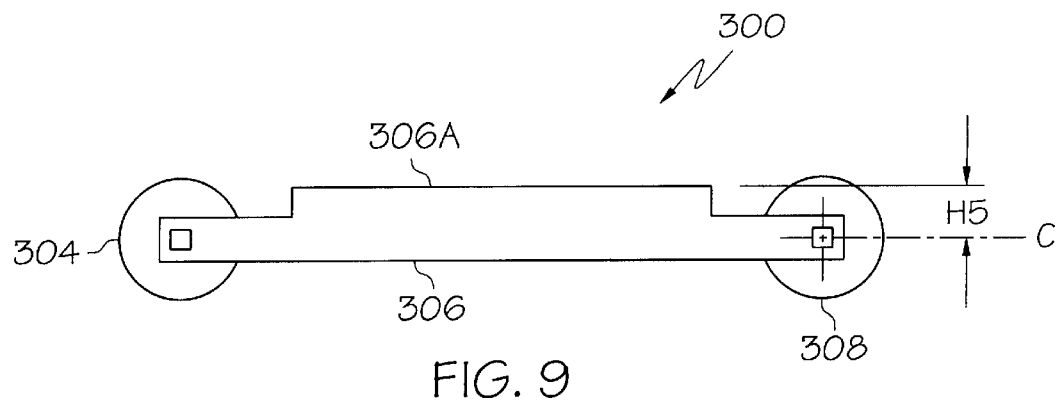
FIG. 9 is a side view of the conveyor system shown in FIG. 5 with the modular bed module and the pulley sleeves removed.
Figure 10:
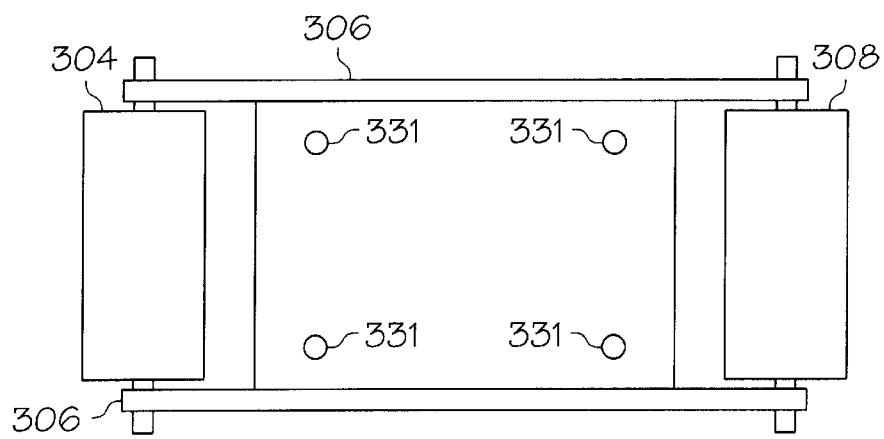
FIG. 10 is a bottom view of the conveyor system shown in FIG. 9.
Figure 11:
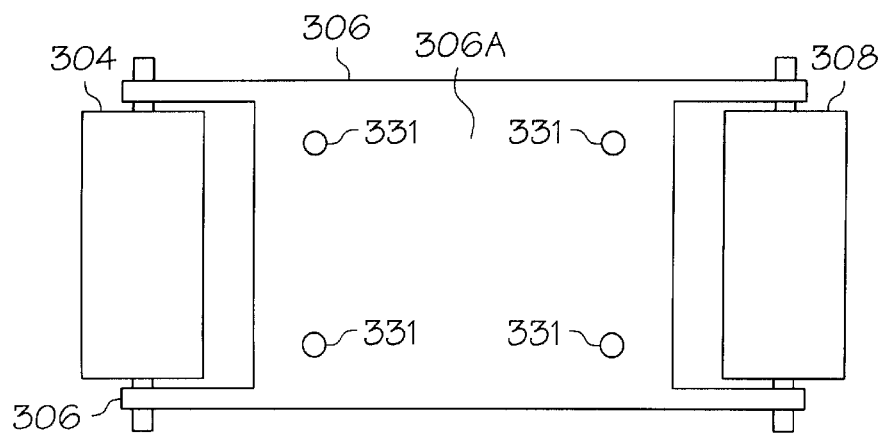
FIG. 11 is a top view of the conveyor system shown in FIG. 9.

As shown in FIGS. 7, 9 and 10, frame 306 is made of a unitary piece of sheet metal, preferably steel, bent into a U-shape. Although FIG. 7 shows relatively sharp corners at the bends in frame 306, in practice some bend radius will generally be required at the corners. The bend radius will vary depending upon the sheet metal material and the sheet metal thickness which is used. Due to the geometry of frame 306, the bed surface 306A of frame 306 is substantially continuous, except for the holes 331.

Figure 3:
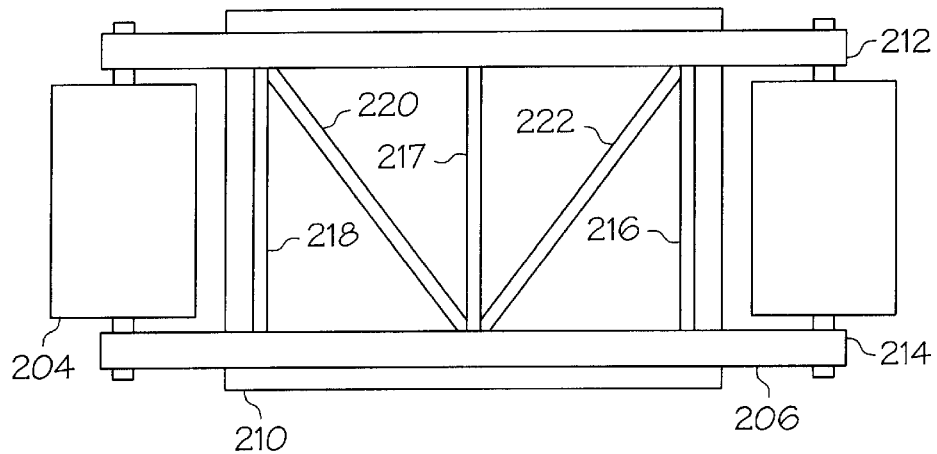
FIG. 3 is a bottom view of the conventional conveyor system embodiment of FIG. 2.
Figure 4:
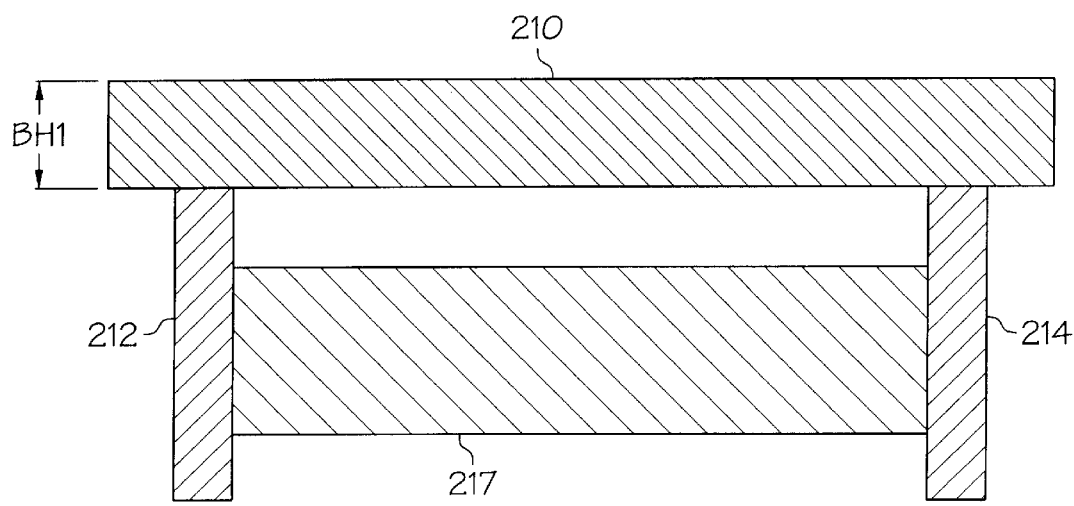
FIG. 4 is a partial sectional view of the conveyor belt system shown in FIG. 2 as viewed from section lines IV in FIG. 2.

The term "bed surface" is used herein to mean a surface suitable for supporting a conveyor belt. A lattice of elongated members, as shown in FIG. 3, would not be a bed surface. Because the surface 306A is relatively continuous and the holes 331 are relatively small, surface 306A is a suitable bed surface. Therefore, frame 306 includes both a bed surface 306A and bed mounting structures (e.g. holes 331). Although a bed surface, such as bed surface 306A, does not have to be completely continuous, preferably a bed surface should be effectively continuous in that it is continuous enough to support a conveyor belt for its expected application.

As shown in FIG. 5, the bed surface 306A at the top of the frame 306, the, top of the drive pulley 304 and the top of the tail pulley 308 all reach a height of BH11. Because the bed surface of the frame 306A, the drive pulley 304 and the tail pulley 308 are all matched in height, a conveyor belt (not shown) can be looped directly around the outer surfaces of these components 304, 306A, 308.

In this way, the conveyor belt system 300 can be used as a basic module (frames and pulleys) without any bed module 310 or pulley sleeves. This allows the basic modules to be stocked in a usable inventory, even if it has not been determined which bed modules 310 (if any) and pulley sleeves 305, 309 (if any) will be needed. The basic module without a bed module 310 or pulley sleeves 305, 309 is in itself a low profile, general purpose conveyor system.

On the other hand, if the need for a special purpose conveyor system, such as a vacuum conveyor system or a magnetic conveyor system, does arise, the basic module can be quickly and easily converted to any number of special purpose conveyor system with the selective addition of an appropriate bed module and matched height pulley sleeves. Several types of special purpose bed modules will be discussed below in connection with another preferred embodiment of the invention (conveyor system 400).

Figure 12:
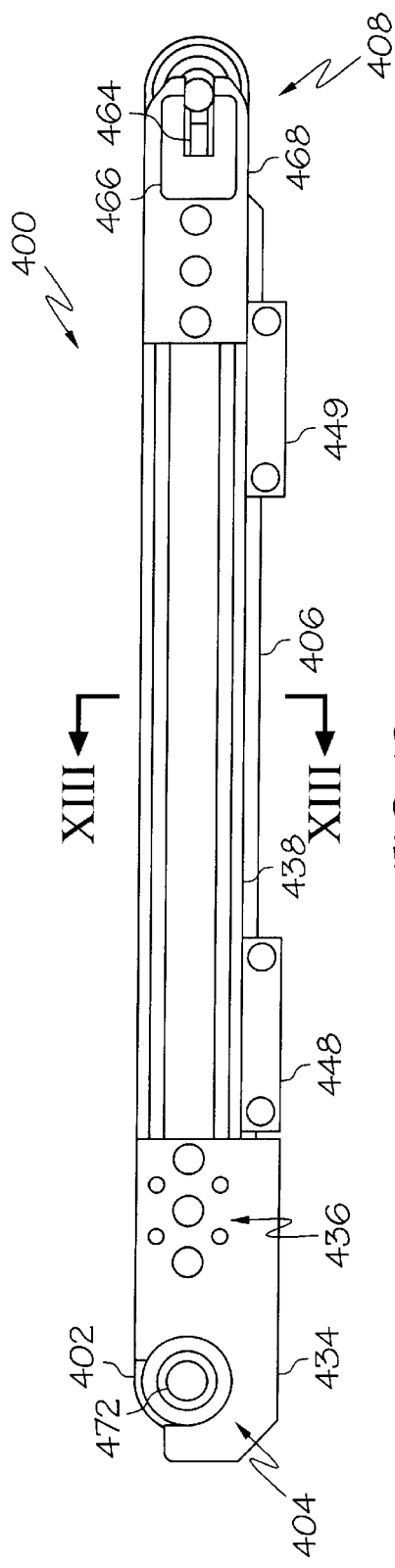
FIG. 12 is a side view of a second embodiment of a conveyor belt system according to the present invention.

FIGS. 12 to 26 show a second modular conveyor system 400 according to the present invention. FIGS. 12 to 17 show the basic module without any detachable bed or pulley sleeves. As shown in FIG. 12, the belt 402 is looped around drive pulley assembly 404 and tail pulley assembly 408. The frame holding the pulley assemblies 404, 408 includes frame main body 406, drive pulley side plate 434, tail pulley side plate 468 and threaded rod 464. This frame holds the pulley assemblies 404, 408 in a spaced apart relationship, thus defining the longitudinal length of conveyor system. As further explained below, threaded rod 464 allows longitudinal adjustment of tail pulley assembly 408 so that the tension of the belt 402 can be adjusted.

Figure 13:
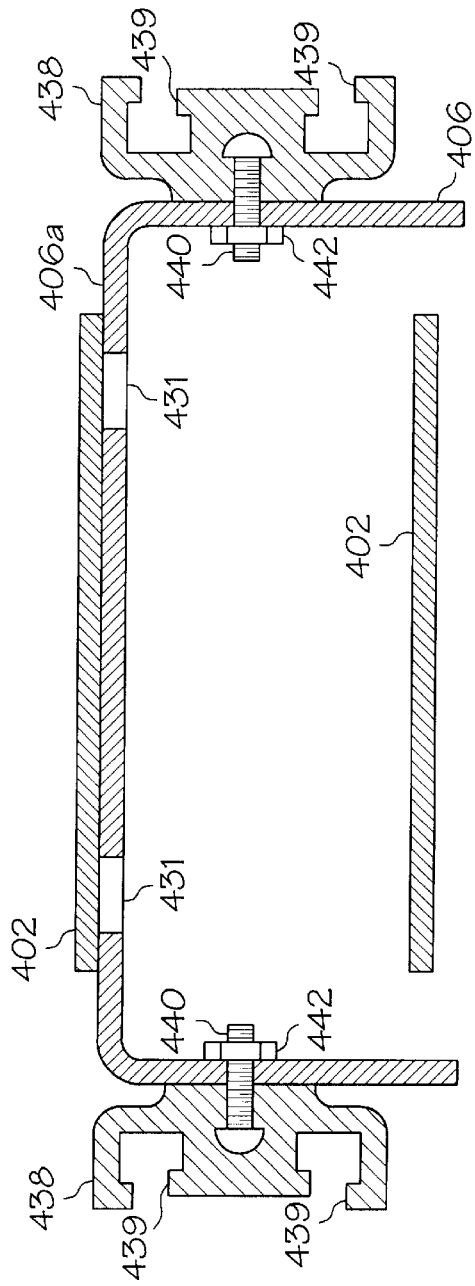
FIG. 13 is a cross-sectional view of the conveyor belt system of FIG. 12, taken along line XIII—XIII thereof.

As shown in FIG. 13, frame main body 406 is made of a single piece of bent sheet metal. Steel is a preferred material because it is 250% stiffer than aluminum and it is less expensive than aluminum. The (load carrying) top portion of belt 402 is supported by bed surface 406A of frame main body 406. The (non-load carrying) return portion of belt 402 shown in FIG. 13 is supported because it is stretched between the pulley assemblies 404, 408. The bed mounting holes 431 through bed surface 406A are small enough that bed surface 406A remains a suitable load bearing bed surface.

As shown in FIG. 13, two aluminum extrusions 438, each having two longitudinal T-slots 439, are mounted to the main frame body 406 by extrusion mounting screws 440 and extrusion mounting nuts 442. The complex cross-sectional profile of the extrusions 438 is easy to form because these parts are made of extruded aluminum.

The T-slots 439 allow attachment of other equipment such as proximity switches (not shown) or guard rails. For example, in some applications, a cleated conveyor belt is used. For these applications, guard rails can be mounted by screws to the T-slots 439, so that the rails extend along the transverse sides of the cleated belt and past the pulley assemblies 404, 408. The guard rails can help prevent objects from getting into pinch points caused by the moving cleats or from otherwise interfering with the cleats.

The extrusions 438, which are highly visible from the sides of the conveyor system 400 (see FIG. 12), are aesthetically advantageous in certain applications (such as most automation applications) in that they will tend to match extruded aluminum parts of adjacent machinery. However, the conveyor system 400 is stronger than an aluminum frame conveyor system because of the steel main frame member 406 which lies behind the extrusions 438.

As shown in FIG. 12, the main frame body 406 is mounted on drive side bottom mounts 448 and tail side bottom mounts 449. The bottom mounts 448, 449 are precisely adjustable so that the conveyor system 400 can be precisely leveled. However, it is noted that drive pulley side plate 434 extends sufficiently below the moving belt so that the bottom surface of drive pulley side plate 434 can be used as a (non-adjustable) mount in lieu of the drive side bottom mounts 448. In this preferred variation, only the tail side bottom mounts 449 are required, and the conveyor belt system can still be precisely leveled by the adjustable tail side bottom mounts 449.

The drive pulley side plate 434 and the tail pulley side plate 468 are fixed to the main frame body 406 by means of screws or the like. The side plate 434 is reversible so that the same plate 434 can be used at either transverse side of the drive pulley assembly 404. A driver (such as a rotary motor, not shown) can be flush mounted at the drive mounting holes 436 in drive pulley side plate 434. The driver is aligned to turn keyed drive pulley shaft 472 and to thereby drive the drive pulley assembly 404 and the belt 402. The tail pulley assembly 408 freely rotates in response to its rolling contact with the belt 402.

One transverse end of the drive pulley assembly 404 is shown in more detail in FIGS. 14 and 15. As shown in FIG. 14, the drive pulley assembly 404 includes a drive pulley 470, a drive pulley shaft 472, an inner bearing race 474, and an outer bearing race 476. The outer bearing race 476 is securely supported by the frame within spherical profile cut-out 480 in side plate 434. The inner bearing race 474 and shaft 472 freely rotate within the outer bearing race 476 by means of ball bearings (not shown) therebetween. The driver (not shown) is connected to the end of keyed shaft 472 and its keyway 473 so that it can drive the shaft 472 as explained above.

As shown in FIG. 14, the outer circumferential edge 478 of outer race 476 has a spherical (rounded) profile. First cut out or spherical profile cut-out 480 in side plate 434 securely holds the outer race 476 so that it is self-aligning. In other words, the outer race 476 can pivot within first cut-out or spherical cut-out 480 in side plate 434 to compensate for misalignment of the central axis of drive pulley 470. For example, this self-aligning, pivoting action can compensate for mechanical misalignment between the drive pulley assembly side plates 434, or deflection in the central axis of the drive pulley caused by the belt 402. In this way, conveyor system 400 can withstand much greater loads than conventional conveyor systems having needle bearings.

Figure 20:
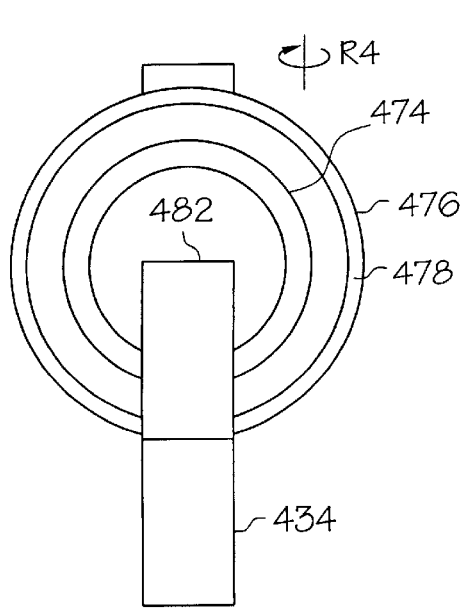
FIG. 20 is a partial end view illustrating insertion of the drive pulley bearing into a side plate.
Figure 21:
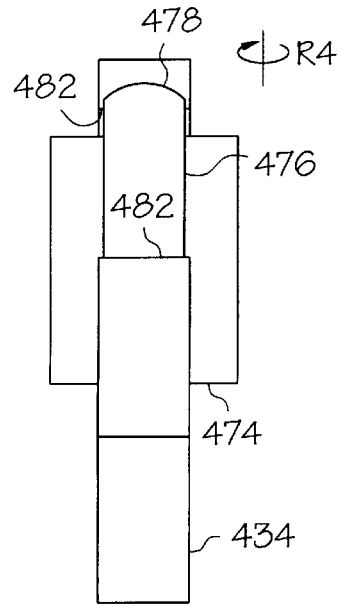
FIG. 21 is a partial end view showing the drive pulley bearing of FIG. 20 after insertion and rotation.

As shown in FIGS. 14 and 15, the side plate 434 also has second cut-out 482 to facilitate insertion of the drive pulley bearing 474, 476. FIGS. 20 and 21 show how the drive pulley bearing 474, 476 can be inserted into the side plate 434 through second cut-out 482. First, as shown in FIG. 20, the bearing 474, 476 is dropped into the bearing through second cut-out 482 so that the bearing 474, 476 is perpendicular to the side plate 434. Next, as shown in FIG. 21, the bearing is rotated 90o in the direction R4 so that the bearing 474, 476 is parallel to side plate 434. As the bearing 474, 476 rotates, spherical outer circumferential surface 478 of the outer bearing race 476 is rotated into pivoting engagement with first cut-out or spherical cut-out 480 in bearing plate 434.

In this way, second cut-out 482 provides for easy insertion of the bearing still allowing an extensive spherical surface of engagement between outer race 476 and side plate 434. The first cut-out or spherical cut-out 480 extends all the way around spherical surface 478 (except in the vicinity of second cut-out 482) so that bearing 476, 474 is more secure in its self-aligning engagement with side plate 434, than it would be if a conventional cylindrical bearing were used.

The second cut-out 482 has been located at top end of the side plate 434. This placement of second cut-out 482 provides a couple of advantages.

First, this top-end placement of second cut-out 482 prevents side plate 434 from extending up over the height of the conveyor belt 402, despite the fact that the bearing outer race 476 has a diameter almost as large as the diameter of the pulley. This arrangement allows the use of a relatively large drive pulley bearing (i.e., a bearing as large or almost as large as the drive pulley itself), without having the drive pulley bearing, or the side plate holding the drive pulley bearing, extending up over the level of the top of the conveyor belt, where there could be interference with loads being conveyed which overhang the belt in a transverse direction.

Second, the second cut-out 482 is not located on a surface of the side plate 434 which bears the load caused by the pull of the belt 402. More particularly, the belt 402 pulls the drive pulley 470 and the bearing outer race 476 in a direction towards the tail pulley assembly 408, which causes the bearing outer race 476 to exert force on the portion of spherical cut-out surface 480 oriented toward the tail pulley. The second cut-out 482 is located away from this load bearing portion of first cut-out or spherical cut-out 480, which helps prevent damage to the bearing outer race 476.

Figure 17:
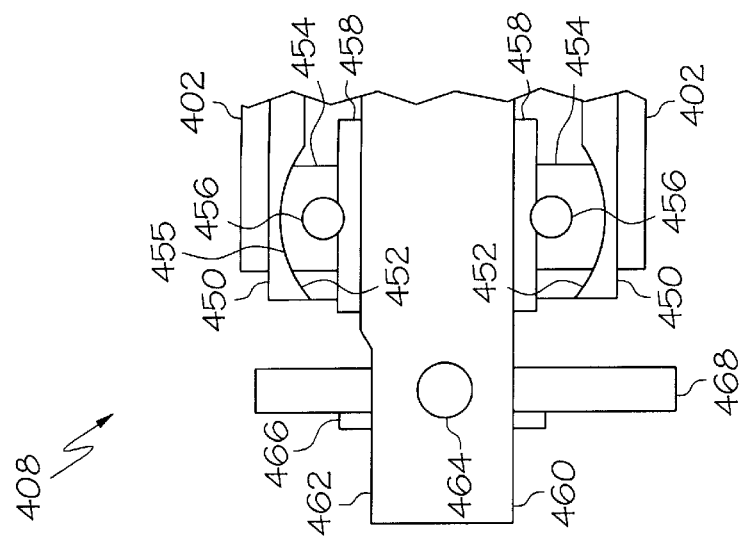
FIG. 17 is a partial end view of the tail pulley assembly of the conveyor belt system of FIG. 12.
Figure 16:
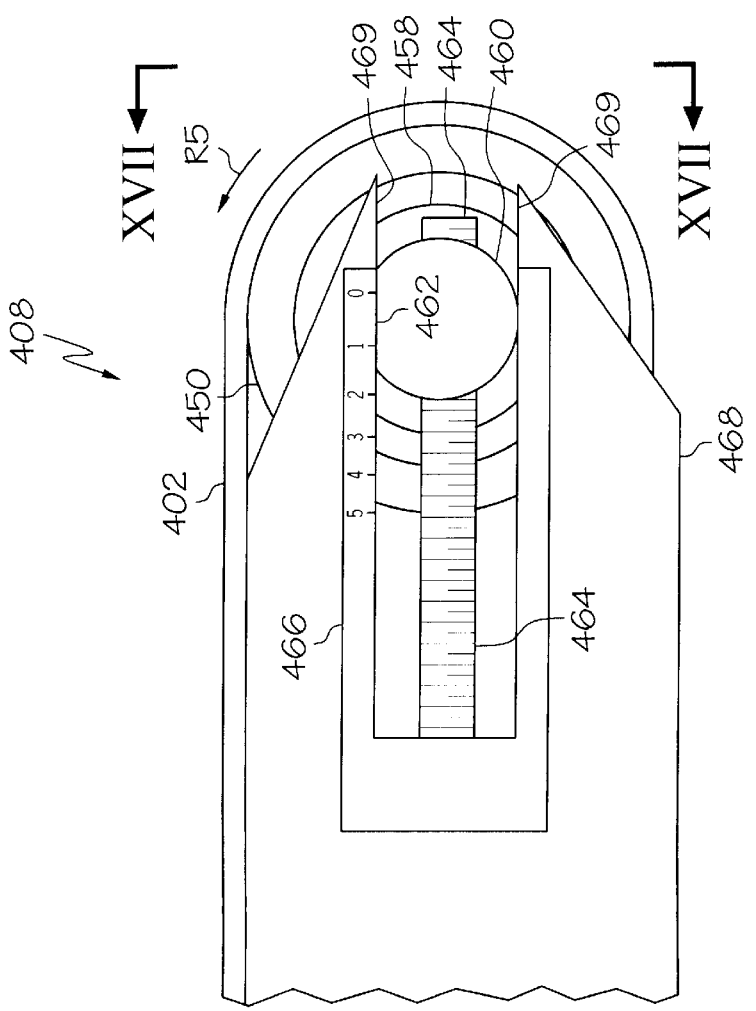
FIG. 16 is a partial side view of the tail pulley assembly of the conveyor belt system of FIG. 12.

FIGS. 16 and 17 show one transverse end of the tail pulley assembly 408. The tail pulley assembly includes tail pulley 450, tail pulley bearing outer race 454, ball bearings 456, tail pulley bearing 458 and tail pulley shaft 460. As further explained below, the tail pulley 450 and the outer bearing race 454 freely rotate in direction R5 in response to the rolling contact between belt 402 and tail pulley 450.

Tail pulley shaft 460 is inserted into groove 469 in side plate 468. Groove 469 prevents the tail pulley shaft from rotating about its central axis (in direction R5). More specifically, groove 469 engages flat 462 at the end of tail pulley shaft to prevent the tail pulley shaft 460 from rotation. Inner bearing race 458 is fixed to tail pulley shaft 460 and is therefore also prevented from rotating. However, ball bearings 456 between inner race 458 and outer race 454 do allow the outer race 454 and tail pulley 450 to rotate in direction R5.

As shown in FIG. 16, flat 462 of shaft 460 is adjacent to the upper side of groove 469. However, if the tail pulley assembly 408 needs to be slightly lowered for better belt height alignment, this can be achieved by flipping the tail pulley assembly 408 so that flat 462 lies along the bottom side of groove 469, rather than the top side.

Similarly to the drive pulley assembly 404 explained above, outer race 454 has a spherical circumferential outer edge 455 which engages with spherical cut-out 452 to allow for a pivoting, self-aligning action, which can compensate for misalignment in the central axis of tail pulley 450. However, unlike the drive pulley assembly 404, the outer race 454 is disposed within the body of the pulley 450, rather than being within the side plate 468 of the frame.

In some preferred embodiments of the present invention, a non-self-aligning bearing, such as a cylindrical bearing, may be used at the tail pulley end because the deflection and alignment problems at the tail pulley end are generally not as great as they are at the drive pulley end.

The longitudinal position of the tail pulley assembly 408 relative to the frame can be precisely controlled, thereby allowing belt 402 to be precisely tensioned. More specifically, the tail pulley assembly 408 can be precisely adjusted away from the drive pulley assembly 404 to increase the tension in belt 402.

This longitudinal adjustment of the tail pulley assembly 408 will now be explained with reference to FIGS. 16, 17, 18 and 19. As shown in FIGS. 16 and 17, threaded rod 464 passes through a threaded hole in tail pulley shaft 460. When the rod 464 is rotated (by hand in this embodiment), tail pulley shaft 460, along with the entire tail pulley assembly 408), will move along groove 469 in the longitudinal direction as a result of its threaded engagement with rotating rod 464.

Ruler plate 466, which is marked with markings at 1 mm intervals, can be used to precisely control the position of the tail pulley assembly to precisely adjust the tension in the belt 402. First, a new belt 402 is looped around the drive pulley 470 and the tail pulley 450 so that there is just enough tension to remove all the slack from the belt. This initial state is easy to achieve because it is visually apparent when all of the slack is taken up.

Now, the belt 402 needs to be appropriately tensioned. Conventionally this tensioning process has been subject to guesswork because there is generally not a visual indication of how far the belt 402 should be pulled beyond the initial state. This can result in over-tensioning or under-tensioning of the belt 402. According to the present invention, ruler plate 466 provides a clear visual indication of the appropriate amount of tensioning.

Figure 18:
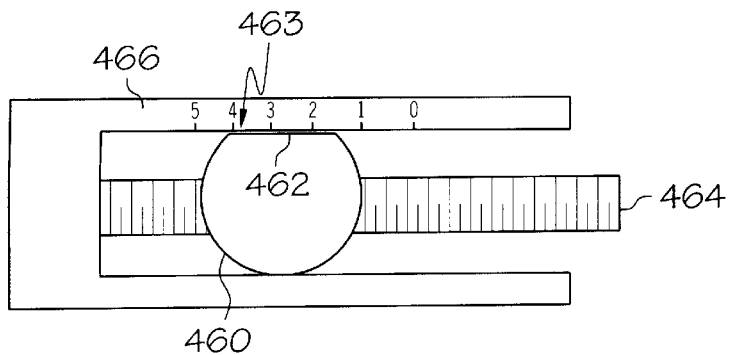
FIG. 18 is a partial side view of the tail pulley shaft and ruler plate of FIG., 17 illustrating the conveyor belt in an initial state without slack.

FIG. 18 shows the tail pulley shaft 460 and the ruler plate 466 when the initial (no slack) state is achieved. The register point 463 of flat 462 of tail pulley shaft 460 is lined up with the '4' mark on the ruler plate 466. In this example, it will be assumed that the belt 402 is 4 feet in length, and that the belt 402 is made of a material such that it should be tightened 1 mm for every foot of belt length. Therefore, the belt 402 needs to be tightened 4 mm from the initial state shown in FIG. 18.

Figure 19:
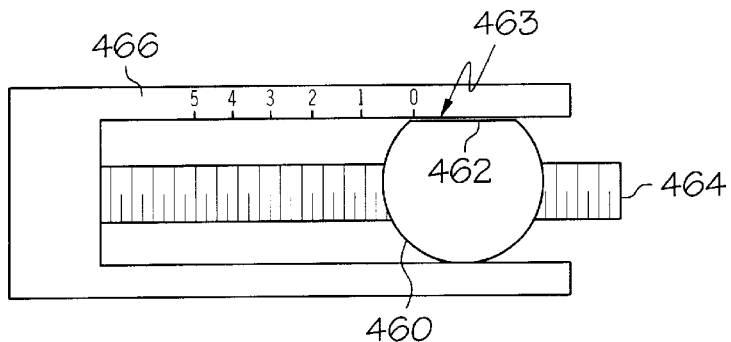
FIG. 19. is a partial side view similar to FIG. 18, showing the tail pulley shaft and ruler plate after the belt has been tensioned.

After the initial state is achieved, threaded rod 464 is rotated so that the register point 463 on the tail pulley shaft 460 is observed to move an appropriate distance (e.g., 4 mm) along the ruler plate 466. In this example, the register point 463 should move from the '4' mark on ruler plate (initial state shown in FIG. 18) 4 millimeters in distance to the '0' mark (as shown in FIG. 19). When the register point 463 is observed to be at the '0' mark, as shown in FIG. 19, the belt 402 is appropriately tensioned.

By using the simple ruler plate 466 to accomplish belt tensioning, expensive, conventional belt tensioning gauges, such as those which directly measure the tension or strain of the belt are not needed. Although the ruler plate 466 may riot allow the ultra-high precision of some expensive, conventional belt tensioning gauges, it will provide more than enough precision for most applications.

It is noted that a similar threaded rod 464 and ruler plate 466 may be provided at the other transverse end of the tail pulley assembly 408, so that both ends of the tail pulley can be precisely brought into longitudinal alignment at an appropriate belt tension. Proper longitudinal alignment can help prevent mistracking of the belt, wherein the belt gradually displaces relative to the pulley in the transverse direction.

FIG. 22 is a side view of the conveyor system 400 with bed module 410 and pulley sleeves 405, 409 installed. Conveyor belt 402 is looped around the pulley sleeves 405, 409 and over the bed module 410. It is noted that the conveyor belt 402 must be a little longer to accommodate the larger diameter pulleys. The drive pulley assembly 404, the bed module 410 and the tail pulley assembly 408 are all matched in height because the thickness of bed module 410 is equal to the annular thickness of pulley sleeves 405, 409. While reference number 410 denotes a bed module generally, several different kinds of specific bed modules will be discussed below with reference to FIGS. 23 to 27.

FIG. 23 shows a magnetic bed module 510 which is mounted on bed surface 406A by bed mounting screws 512. There is a permanent magnet 511 embedded in bed module 510. By using magnetic bed module 510, the conveyor belt can securely transport magnetic objects such as small pieces of metal hardware, without the risk that the objects will fall off the conveyor belt because the objects are held in place by magnetic forces of the magnet 511 in the bed module 510.

Figure 24:
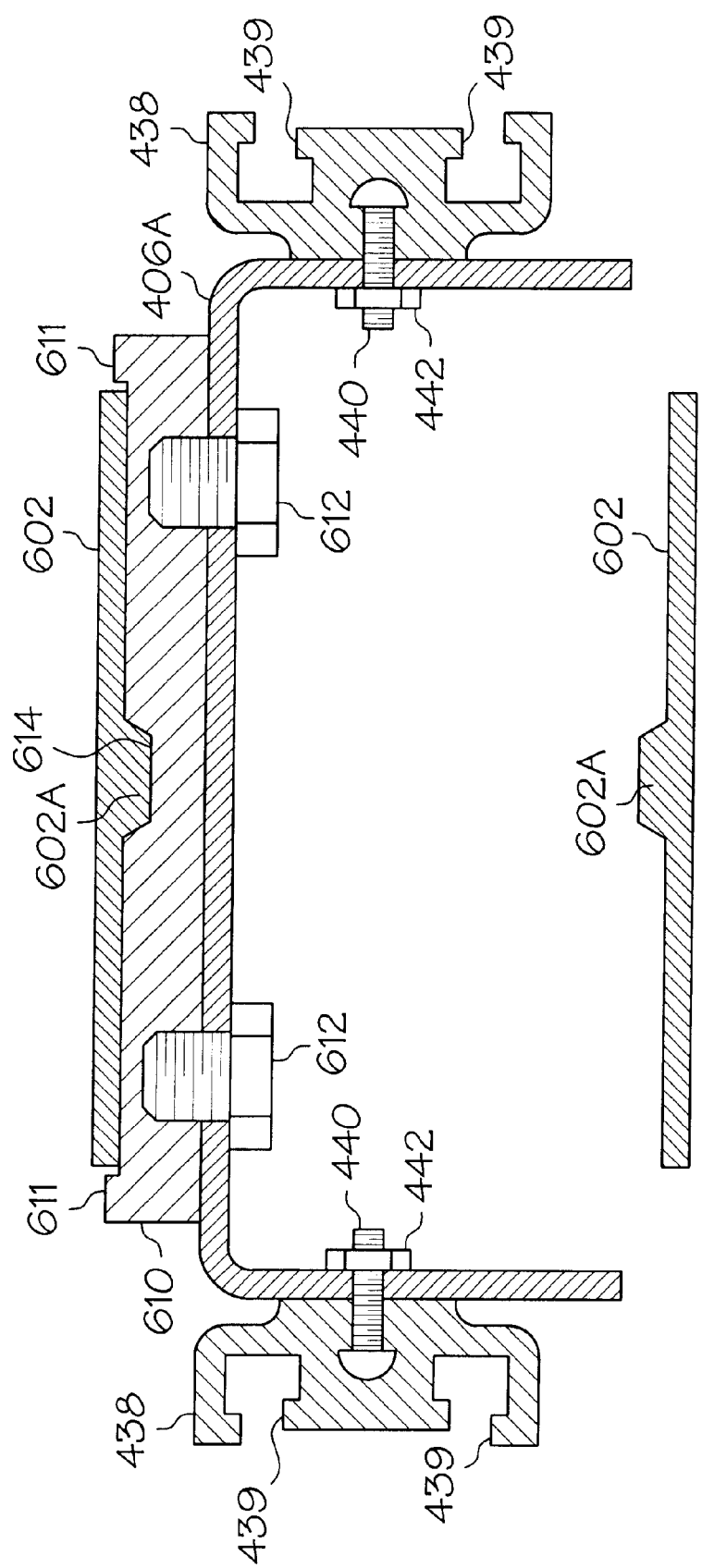
FIG. 24 is a cross-sectional view similar to that of FIG. 23 showing a self-tracking bed module and conveyor belt.

FIG. 24 shows the use of a self-tracking bed module 610 and a special self-tracking conveyor belt 602. This self-tracking belt is designed to keep the conveyor belt from mistracking (i.e., shifting in the transverse direction). More specifically, the conveyor belt 602 has a raised portion 602A on its underside. This raised portion 602A fits into a groove 614 in bed module 610. The pulley sleeves 405, 409 may also be formed with a similar groove to accommodate the raised portion 602A. Also, bed module 610 has low retaining walls 611 on either transverse side of the conveyor belt 602.

Because of the engagement of the conveyor belt 602 (including raised portion 602A) and the groove 614 and retaining walls 611, this self-tracking embodiment can withstand side loads, such as those generated when the conveyor belt is loaded from the transverse direction. Bed module 610 is mounted to bed surface 4063A by bed mounting screws 612. Although bed module 610 has both retaining walls and a groove, other preferred self-tracking bed modules may not include both of these features.

Figure 25:
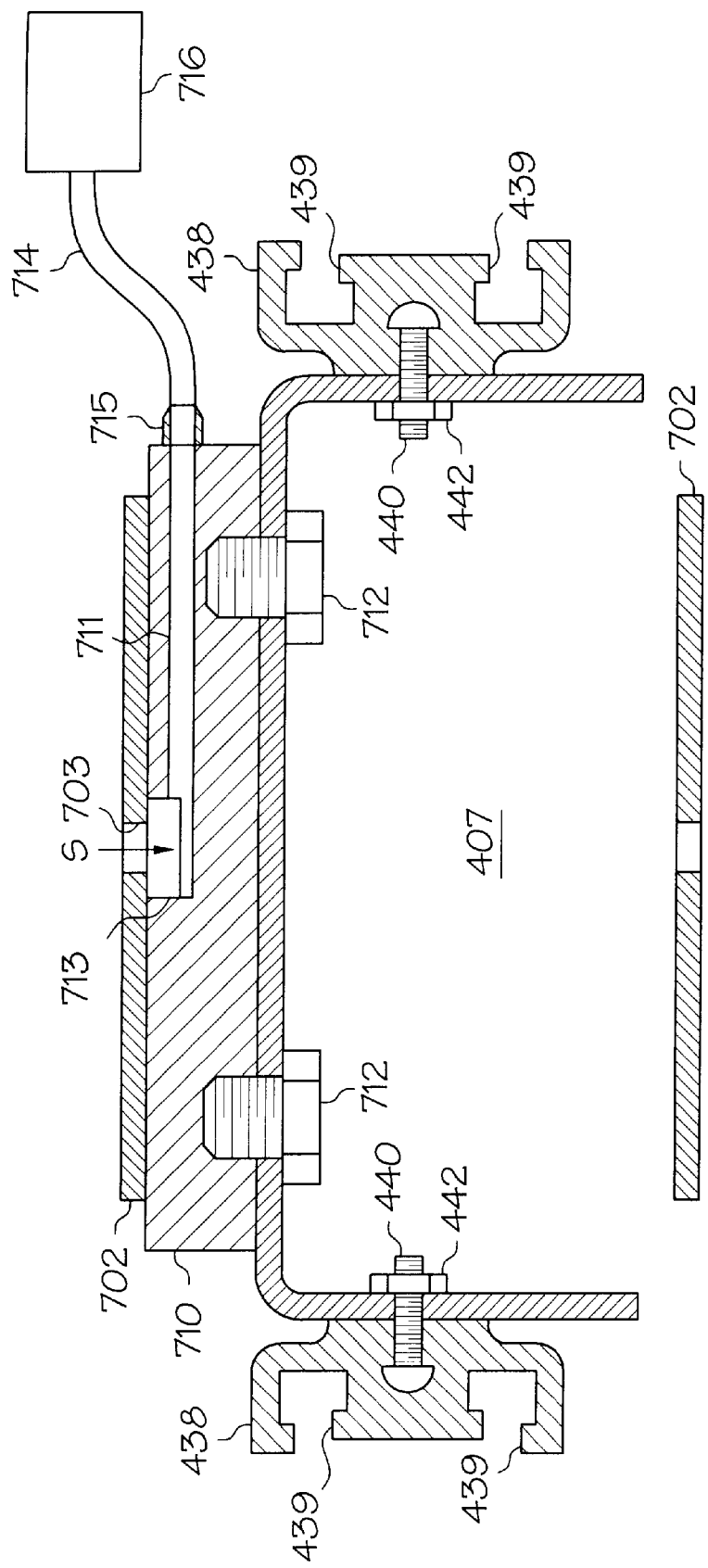
FIG. 25 is a cross-sectional view similar to that of FIG. 23 showing a vacuum bed module.

FIG. 25 shows a vacuum conveyor embodiment which has vacuum bed module 710 mounted to the main frame body 406 by vacuum bed module mounting screws 712. In a vacuum conveyor belt system, suction forces through apertures 703 in the vacuum conveyor belt 702 will pull objects down onto the conveyor belt 702, and thereby secure the objects to the belt 702 through this vacuum force.

Figure 26:
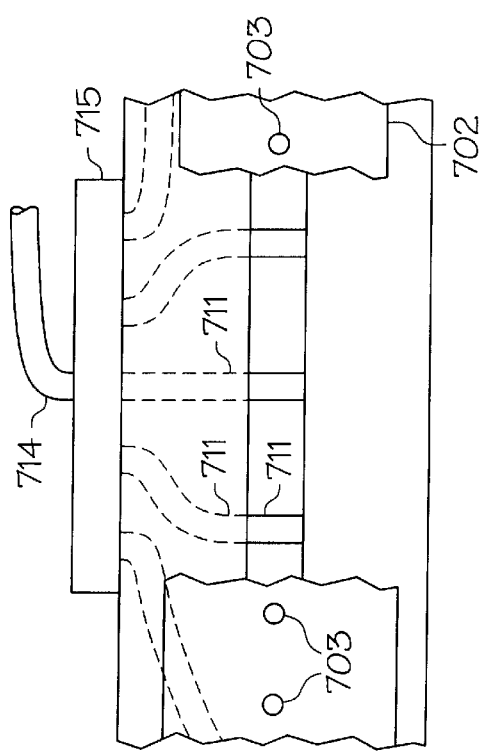
FIG. 26 is a partial, broken-out, top view of a vacuum bed and belt assembly in accordance with the present invention.

As shown in FIGS. 25 and 26, in the vacuum bed module 710, a plurality of channels run from a transverse surface of the vacuum bed module 710 to a groove 713 formed along the top surface of the vacuum bed module 710. A vacuum (i.e., relatively low pressure) is maintained in the groove 713 by drawing air out of the groove 713 through the channels 711. This causes suction forces, in the direction of arrow S, through the apertures 703 of the vacuum conveyor belt 702.

The vacuum is maintained in the groove 713 and channels by means of a vacuum pump 716. Connector 715 forms a substantially air tight connection at the transverse surface of the bed module 710 in the vicinity of the channels 711. Air is drawn out of the channels 711, through connector 715 and hose 714 to maintain the vacuum.

This embodiment with vacuum bed module 710, provides an important advantage over many conventional vacuum conveyor belt systems. In many conventional vacuum conveyor belt systems, a vacuum is maintained in an open volume within the frame (see the open area 407 within frame 406). However, the frame is generally not air tight, so air will leak into the frame, especially through the space between the frame and the pulley at the transverse ends of the frame. Maintaining a vacuum in the face of this air leakage requires the vacuum pump to have a large capacity. On the other hand, according to the present invention, the vacuum is confined to relatively small channels 711 and groove 713. Maintaining a vacuum in this relatively small volume, confined within bed module 710, does not require as much vacuum capacity of the vacuum pump 716.

Figure 27:
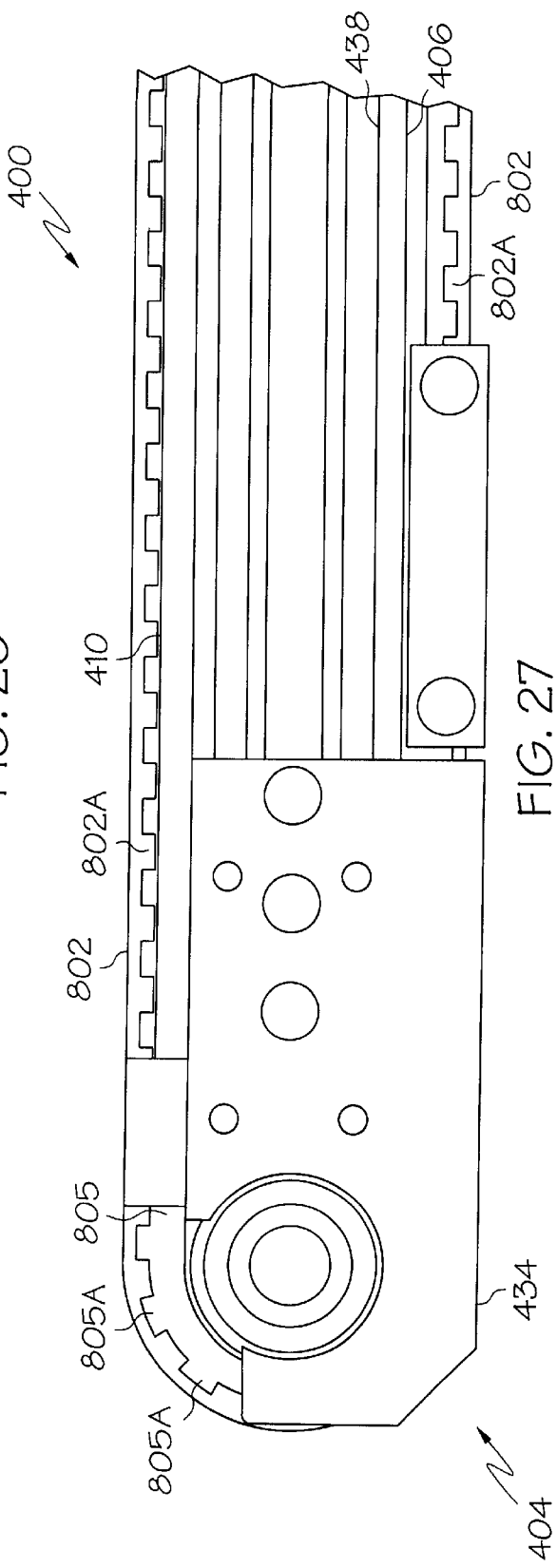
FIG. 27 is a partial side view of a synchronous conveyor belt embodiment of a conveyor system according to the present invention.

FIG. 27 shows a side view of the drive pulley end of a synchronous conveyor belt embodiment according to the present invention. In this synchronous embodiment, special synchronous conveyor belt 802 is looped around synchronous drive pulley sleeve 805. Teeth 802A on synchronous conveyor belt 802 mesh with teeth 805A on synchronous pulley sleeve 805. The engagement of these teeth prevents conveyor belt 802 from slipping in the longitudinal direction.

Synchronous pulley sleeve 805 and synchronous belt 802 are used with a flat bed module 410. (In some preferred embodiments, a bed module for use in a synchronous system will have either retaining walls or a groove for self-tracking purposes.) Furthermore, the pulley sleeve at the tail pulley end does not need teeth because the mesh engagement of teeth at the drive pulley end only is sufficient to prevent longitudinal slippage for most applications. It is noted that the synchronous drive pulley sleeve 805, bed module 410 and the tail pulley sleeve (not shown) are matched in height. Pulley sleeve 805 is preferably formed of aluminum in order to facilitate the formation of teeth 805A.

In the preferred conveyor system 400 with optional bed modules, 410, 510, 610, 710, the drive pulley 470, the tail pulley 450 and main body 406 are dimensioned so that 0.5 inch thickness bed plates 410, 510, 610, 710 can be used.

This allows the majority of bed plates to be manufactured from standard 0.5 inch thick sheet stock (e.g., 0.5 inch thick UHMW stock). Designing the conveyor system so that the bed plates have a thickness which is a standard sheet stock thickness, like 0.5 inches) can reduce the cost of manufacturing the bed plates. However, it is noted that the pulley sleeves may have an annular thickness which is slightly greater than the thickness of the bed plate, because pulley sleeves tend to be made of more elastic materials, such as rubber or urethane which may decrease in thickness when they are friction fit over the pulleys.

The magnetic bed module 510, the self-tracking bed module 610, the vacuum bed module 710, and the synchronous conveyor belt embodiment with synchronous pulley sleeve 805, demonstrate the versatility of a conveyor belt system according to the present invention. A single basic module can be utilized in several different special applications as the need arises with the installation of an appropriate bed module and pulley sleeves. This is especially advantageous in a setting where many different conveyor belts are used because inventories of the basic module can be maintained, even when its eventual application (e.g., magnetic, vacuum) is not yet known.

Through the use of a basic module (with a bed surface) that can be used alone or with various special purpose bed modules, a single conveyor system can be used for a variety of applications which would otherwise require resorting to several different conveyor systems. In this way, the present invention can reduce maintenance costs. This can also reduce the number of spare parts which need to be stocked, by virtue of the fact that spare parts need only be stored for a single system). Furthermore, this can also reduce the number of basic conveyor belt systems that need to be kept in inventory, because the same basic module can be used regardless of whether desired applications which arise require a basic conveyor belt or a special purpose conveyor belt (such as a magnetic or high speed system).

Other types of special application bed modules and pulley sleeves are also possible. For example, a bed module and pulley sleeves might be used to assemble a high speed conveyor system embodiment. Because the pulley sleeves increase the affective outer diameter of the drive pulley, the conveyor belt will travel faster, for a given rotational velocity, when a pulley sleeve is installed. Also, the conveyor belt can be operated without any bed module or pulley sleeves, as shown in FIG. 12. By using the basic module, without bed module or pulley sleeves, the vertical profile of the conveyor belt is minimized.

Of course, many modifications to the above-described conveyor belt system embodiments are possible. For example, the present invention is applicable to center drive conveyor belts. The foregoing examples and various preferred embodiments of the present invention set forth herein are provided for illustrative purposes only and are not intended to limit the scope of the invention defined by the claims. Additional embodiments of the present invention and advantages there,of will be apparent to one of ordinary skill in the art and within the scope of the invention defined by the following claims.

What is claimed is:

1. A conveyor belt system comprising:

a pulley;

a bearing comprising an inner race connected to the pulley and an outer race, the outer race having an outer surface; and a frame comprising a side plate having a bottom end and a top end, the top end having defined therein a first cut-out, with at least a portion of the outer surface of the outer bearing race being engaged within the first cut-out, the side plate also having defined therein a second cut-out, wherein the second cut-out provides an opening into the first cut-out.

2. The conveyor belt system according to claim 1, wherein the outer surface of the outer race and the first cut-out each have an annular surface having a spherical profile.

3. The conveyor belt system according to claim 1, wherein the outer race may be inserted through the second cut-out into the first cut-out to facilitate the engagement between the outer surface of the outer race and the first cut-out.

4. The conveyor belt system according to claim 3, wherein the outer race is adapted to be inserted into the side plate with the outer surface of the outer race at an angle to the side plate and then turned into engagement with the first cut-out with the outer surface being parallel to the side plate.

5. The conveyor belt system according to claim 4, wherein the first cut-out comprises a spherical profile for receiving the outer race.

6. The conveyor belt system according to claim 1, wherein the second cut-out is formed adjacent the top end of the side plate, and further wherein the top end of the side plate has a top edge extending along a plane tangential to the outer surface of the outer race.

7. The conveyor belt system according to claim 1, further comprising at least one set of bottom mounts attached to the frame, the set of bottom mounts being adjustable relative to the frame.

8. The conveyor belt system according to claim 7, wherein said bottom mounts may be adjusted to provide support for the conveyor system.

9. The conveyor belt system according to claim 7, wherein said bottom mounts comprise a tail side set of bottom mounts.

10. The conveyor belt system according to claim 7, wherein said bottom mounts comprise both a drive side set of bottom mounts and a tail side set of bottom mounts.

11. The conveyor belt system according to claim 1, wherein the bearing further comprises a plurality of ball bearings disposed between the inner race and the outer race.

* * * * *